(12) United States Patent
Koizumi et al.

(10) Patent No.: US 6,451,249 B1
(45) Date of Patent: *Sep. 17, 2002

(54) COMPOSITE AND METHOD FOR PRODUCING THE SAME

(75) Inventors: Mitsue Koizumi, Toyonaka (JP); Manshi Ohyanagi, Ootsu (JP); Satoru Hosomi, Oyama (JP); Evgeny A. Levashov, Moscow (RU); Alexander V. Trotsue, Moscow (RU); Inna P. Borovinskaya, Moscow (RU)

(73) Assignees: Ishizuka Research Institute, Ltd., Kanagawa-ken (JP); Mitsue Koizumi, Osaka-fu (JP); Manshi Ohyanagi, Shiga-ken (JP); Moscow Steel & Alloys Institute SHS-Center, Moscow (RU)

( * ) Notice: Subject to any disclaimer, the term of this patent is extended or adjusted under 35 U.S.C. 154(b) by 40 days.

This patent is subject to a terminal disclaimer.

(21) Appl. No.: 09/663,673

(22) Filed: Sep. 18, 2000

Related U.S. Application Data

(62) Division of application No. 08/617,904, filed as application No. PCT/JP94/01570 on Sep. 22, 1994, now Pat. No. 6,203,897.

(30) Foreign Application Priority Data

| Sep. 24, 1993 | (JP) | ................................. 273265 |
| Jul. 7, 1994 | (JP) | ................................. 188718 |
| Aug. 23, 1994 | (JP) | ................................. 233995 |

(51) Int. Cl.$^7$ .............................. B22F 7/06; B22F 7/08
(52) U.S. Cl. ............................. 419/10; 419/5; 419/45
(58) Field of Search ........................ 419/45, 5.45, 10

(56) References Cited

U.S. PATENT DOCUMENTS

| 4,604,106 | A | * | 8/1986 | Hall et al. .................... 51/293 |
| 4,844,988 | A | * | 7/1989 | Ishizuki et al. ............. 428/408 |
| 5,011,515 | A | * | 4/1991 | Frushour et al. ............ 407/119 |
| 5,030,596 | A | * | 7/1991 | Kume et al. .................. 51/307 |
| 5,211,726 | A | * | 5/1993 | Slutz et al. ................... 51/293 |
| 5,304,342 | A | * | 4/1994 | Hall, Jr. et al. ............... 419/11 |
| 5,585,175 | A | * | 12/1996 | Brandrup-Wognsen et al. .......... 428/698 |
| 6,171,709 | B1 | * | 1/2001 | Koizumi et al. ............. 428/545 |
| 6,203,897 | B1 | * | 3/2001 | Koizumi et al. ............. 428/336 |

* cited by examiner

*Primary Examiner*—Daniel J. Jenkins
(74) *Attorney, Agent, or Firm*—Larson & Taylor PLC

(57) ABSTRACT

This invention provides a composite product and an effective method for producing the same, based on an SHS or intense heat producing process. Said composite essentially comprises either (1) one or more skeletal structures of three dimensionally joined pieces of at least one ceramic material selected from carbide, boride, nitride and silicide of titanium, zirconium, tantalum, niobium, silicon, chromium, tungsten, and molybdenum, and metallic material of alloy and/or intermetallic compound which fills the gaps within each and between adjacent skeletal structures, or (2) a matrix consisting of SHS products of metallic and/or ceramic substances, and particles of superabrasive selected from diamond and high pressure polymorphism of boron nitride, which are held and distributed in the matrix in the whole, in the surface or surface area comprising the portion corresponding to the end working face. Also effective is the use of superabrasive particles coated with metallic and/or nonmetallic materials by some specific techniques.

17 Claims, 4 Drawing Sheets

COMPOSITE AND METHOD FOR PRODUCING THE SAME

This application is a Div of Ser. No. 08/617,904 Aug. 12, 1996 now U.S. Pat. No. 6,203,897 which is a 371 of PCT/JP94/0470 Sep. 22, 1994.

TECHNICAL FIELD

This invention relates to a ceramic/metallic composite and method for producing the same, based on the self-propagating high-temperature synthesis (SHS) and such compact which comprises superabrasive particles of diamond or high pressure polymorphism of boron nitride, or cBN or wBN, dispersed in a matrix of metallic and/or ceramic matrix.

BACKGROUND OF INVENTION

Ceramic/metallic composites as a novel material which show a combined nature of ceramic and metal are useful for application to construction materials or the like. For manufacture, a technique called SHS is known, which is based on the process which occurs with a certain material system: a combustion, once initiated by igniting at a spot, sustains itself and propagates throughout the rest of the material, due to an intense production of heat which spreads and causes a sufficient temperature rise. This technique advantageously facilitates the preparation of a substance of melting point over 2000° C., and useful for the production of functional materials such as carbide, nitride, boride, silicide or oxide of the fourth or fifth group metals of the periodic table, including Ti, Zr, Ta, Si, as well as intermetallic compounds. The technique is fully described in "The chemistry of SHS", published by T.I.C. (1992).

It is known that the synthesis process can be initiated by:
(1) putting into contact with an electroresistive heater or like a pellet, or formed compact body, of mixed powder so composed as to be capable of SHS (direct ignition) and igniting at an end;
(2) providing, in contact with the pellet at an end, another mixed powder of SHS capable composition; the latter is ignited and the resulting intense heat is used to ignite, in turn, the pellet (two-step ignition); and
(3) heating with a heat source (electroresistive element, for example), which is provided around, so as to ignite the formed compact body (indirect ignition).

Of the three above, the techniques (2) and (3) are commonly employed for the purpose of facilitating ignition to the pellet body when the principal heat source is insufficient for the self-propagation of the process: it uses as a secondary heat source a premixed powder which is provided around the compact body as described above.

Thick or massive composites can be obtained by an SHS-based sintering technique when the SHS products either melt or soften. However it is hardly the case with titanium carbide composite, for example, which is obtained as a porous product, when prepared with a starting mixed powder of metal and carbon. Probable reasons are: (1) the carbide product has a melting point too high, and (2) a solid state reaction can take place between Ti and C at rather a low temperature, and produces TiC which forms a firm network. Here densification may be achieved to a degree by compression, but it is impossible to obtain a product substantial free of pores. This is also the case with the synthesis of other high melting materials.

An SHS process, which can produce high temperatures over a short period of time almost adiabatically, is employed for the formation and sintering, simultaneous or subsequent, of high melting materials and, if tentatively, for the preparation of compact of various materials. For the materials, these techniques are available: static compression with a mechanical press, instantaneous compression by explosive detonation, isostatic compression with a HIP system, pseudo-HIP process whereby the formed compact is squeezed from around with a mechanical press in a die by means of molding sand.

On the other hand, composites of diamond or high pressure polymorphism of boron nitride (cBN or wBN), either interjoined or dispersed and held in the matrix, are widely employed in industries. The superabrasive substances are metastable under normal pressure and more so at high temperatures such as used in the sintering process: they both can transform rapidly to the low pressure polymorphism, that is graphite or hexagonal boron nitride, so an ultrahigh pressure is needed in order to prevent such unfavorable transition processes by establishing a condition where those superabrasive substances are thermodynamically favored phases, and pressures of several (more than four, commonly) giga-pascals are exerted in sintering processes. Thus the volume available poses limitation to the largest product dimensions achievable, which is currently around three inches (76.2 mm) in diameter.

Some less firm-structured wear-resistant materials wherein super abrasive particles are not necessarily interjoined, are tentatively prepared by means of either HIP or hot pressing, instead of the ultrahigh pressure technique. These processes are advantageous in that larger wear-resistant products can be achieved as essentially free of equipment related limitation, while in the manufacture of heat resistant composite products a maintained temperature of 1000° C. or more is needed for several minutes for the densification of the matrix, due to the nature of the process and implementation. This inevitably causes transition, partly or essentially, of the superabrasive to the low pressure phase, and resulting deterioration in particle properties and retention to the matrix make it difficult for these wear-resistant materials to be substituted for those ultrahigh pressure compacts.

SHS processes cause often a temperature rise to more than 2000° C., although heat evolves usually over a short period of several seconds. No techniques have been available, as far as the Inventors are aware, which could apply such almost instantaneous heating to apply in the manufacture of compacts, of composite or not, which comprise superabrasive particles.

Therefore, one of the principal objects of the present invention is to provide an effectively densified compact body of titanium carbide and other ceramics which are difficult, as described above, to be produced as a dense compact by SHS, and in particular, such construction material which consists of a ceramic skeletal structure, densified with metallic phase which is filled in the internal gaps by penetrating with fused Ti—Al alloy (or intermetallic compound). Another object of the invention is to provide an adequate method for the preparation of such compacts.

Another object is to provide a novel superabrasive containing compact which is essentially free of heretofore inevitable limitation in the product size and deterioration in abrasive strength. A further object is to provide an effective method of producing such compacts.

DISCLOSURE OF INVENTION

The first aspect of the invention is a sintered composite body which comprises an integrated body or several refractory pieces or ceramic particles and metallic material filling the gaps within and among them, with the former being selected from carbides, borides, nitrides, and silicides of Ti, Zr, Ta, Nb, Si, Cr, W and Mo and joined three-dimensionally, and the latter comprising one selected from binary alloys and intermetallic compounds of the systems of Ti—Al, Ti—Ni and Ni—Al. The composite can be prepared basically by: admixing powder of Al and/or Ni metal to a metal/non-metal powder mixture so formulated as to be capable of producing such refractory products by SHS, mixing and molding said powder to form a pellet, placing the latter in a die, initiating an SHS process within the pellet to cause fusing, at least partly, and softening of said both metals by the heat produced thereby and forming the skeletal structure of refractory compound, while filling the skeleton gaps with the flowing metal.

The heat volume to be produced depends on the starting chemical system, so while it may be essentially sufficient for sustaining the process of skeletal formation and causing the metallic material to flow and fill the gaps with one composition, it may be not with another. Such problem can be eliminated by the so-called chemical oven technique, whereby another chemical system or powder composition is provided for an SHS process and supplementary heat is supplied from around the formed pellet.

It is now possible to effectively achieve superabrasive particles of good workability in various densified matrix of composite, by adding the particles to the formed pellet and employing an SHS process to serve as a heat source for causing the matrix to flow, under a pressure-temperature condition where diamond is metastable. The heat source chemical system may be comprised either as matrix components or in adjacency of a matrix composition which is essentially free of heat production. In the both cases, the matrix comprises certain components which can melt or soften under the high temperature conditions provided by the SHS process. The fused or softened materials are compressed to make a composite body of densified structure. The compression is started slightly after the completion of the SHS process. Superabrasive particles may be comprised, as desired, partly on or in the surface or uniformly in the whole volume of the resulting composite, for example.

Single or multilayered coating of metallic and/or ceramic material may be deposited on the superabrasive particles for performing an improved retention to the matrix and, thus, improved grinding performance.

In the process of invention, graphitization of diamond superabrasive and resulting deterioration in either particle properties or retention to the matrix is minimal and negligible, since the high temperature reaction is accomplished to terminate within a very short period. Further, in spite of frequent observations, with conventional manufacturing techniques of grinding tools with diamond particles, that pitting corrosion occurs on diamond particles when placed and heated in contact with titanium or other transition metal component in the matrix, due to the reaction of carbon and metal, such corrosion of diamond particles and resulting deterioration in particle strength is minimized and there are essentially no related problems any more, since very little mass of carbon moves from the diamond to the metal within such a very short time the carbide forming process lasts.

Moreover, in the invention, graphitization of diamond particles proceeds only insignificantly even if arranged and heated in contact with such harmful graphitizer metal as Fe, Ni or Co as a support material or a filler or other component of the matrix, since the reaction process lasts only for a very short time, as described above. This is probably due to the short heating time for the diamond, as well as the formation on the diamond of TiC film, which serves as a barrier to the diffusion of carbon and iron-group metal atoms.

The maximum attainable temperature in the SHS materials during the process can be estimated essentially by the adiabatic combustion temperature for the formation of the compound. In case the estimated temperature by far exceeds 2000° C., the SHS material should be diluted with components neutral to the process, in order to prevent the transition of the superabrasive to the corresponding low pressure polymorphism.

PREFERRED EMBODIMENT OF INVENTION

Figure 1:
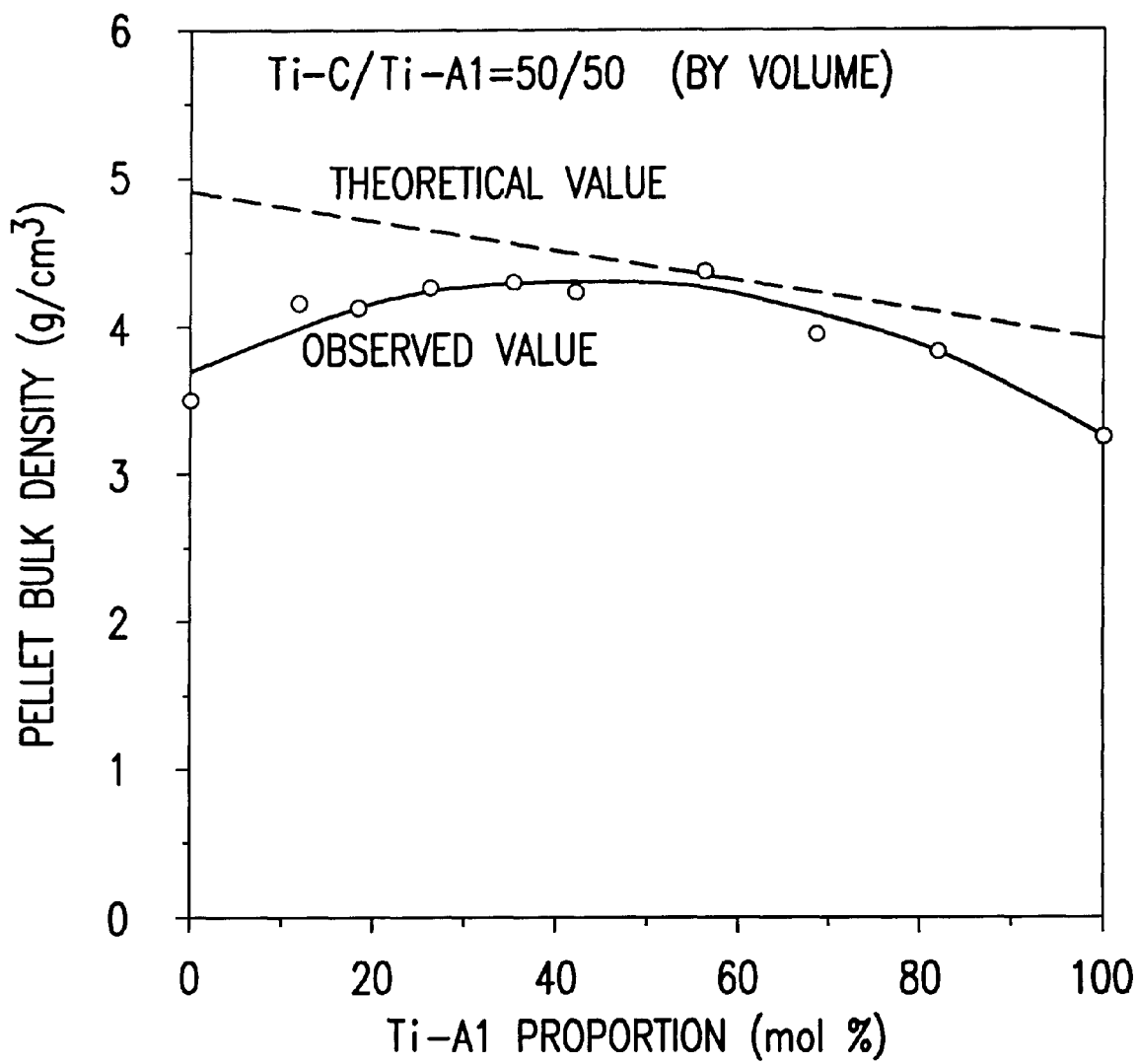
FIG. 1 shows the variation in bulk density of formed pellet, plotted against the proportion of TiAl component comprised in the preparation of a TiC/TiAl composite by the method of invention.
Figure 2:
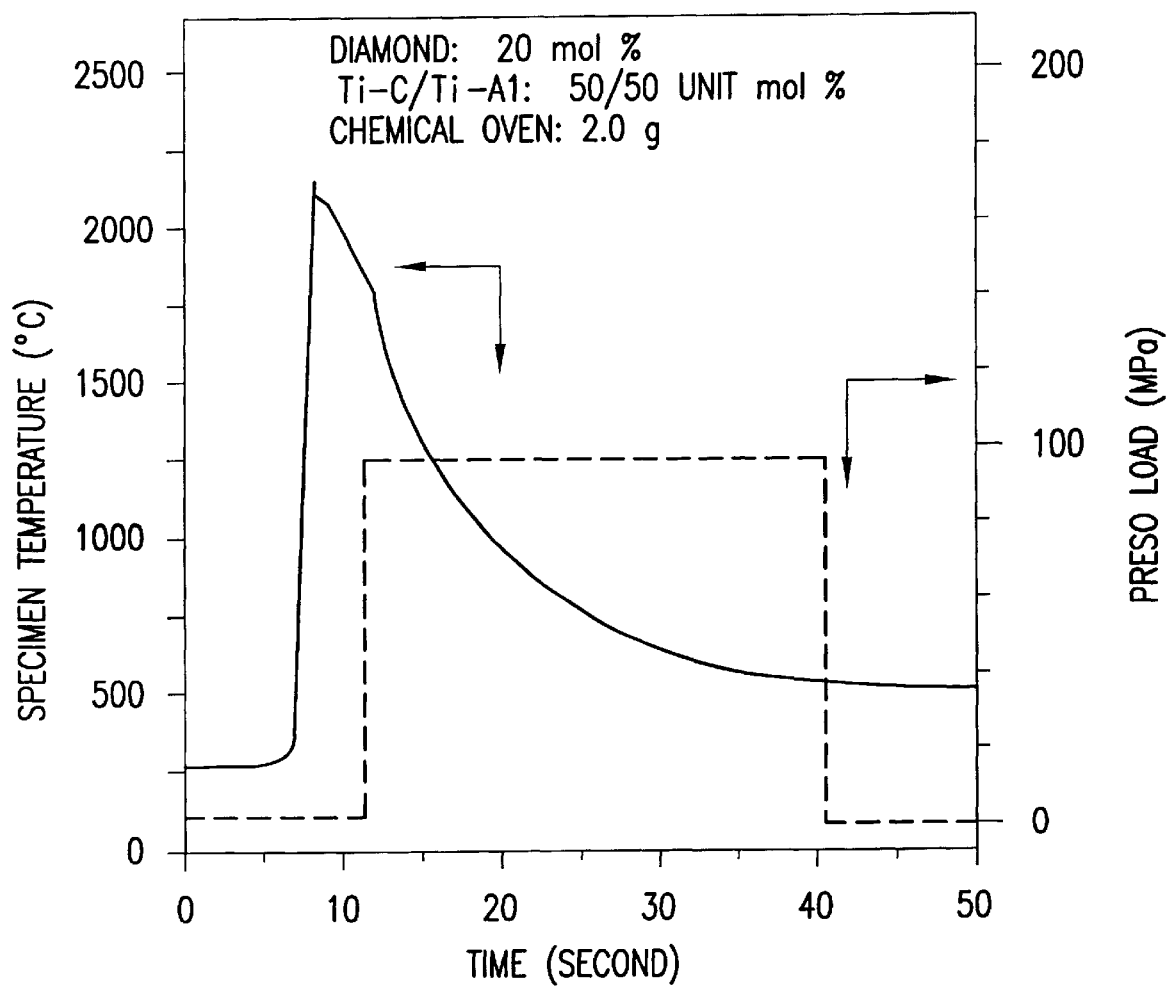
FIG. 2 shows the variation with time of specimen temperature and press load for the case of composite compact with 20 mol. % diamond particles.

The inventors have found that although the rate may be somehow dependent on the magnitude of temperature itself when a superabrasive transforms under intense heat to a lower pressure polymorphism, it is more affected by the duration it is subjected to the temperatures. It is true, as the inventors observed, diamond particles, if comprised in an SHS composition and heated to a temperature of 2000° C. or more for several seconds in order to produce a compact, can show only insignificant deterioration in mechanical properties, in spite of the sensitivity which is even higher than that of boron nitride in high pressure polymorphism.

However, for securing such effects at a good reproducibility, it is necessary to employ a composition formula which will provide a temperature condition not excessively high, or to regulate both the maximum temperature achievable in the reaction zone and the duration of such temperature by admixing and diluting the composition with a neutral ingredient. In particular, the preferred duration is less than one second for temperatures of or over 2000° C. and less than five seconds for temperatures between 2000° C. and 1800° C.

In the invention the starting materials are placed in the reaction arrangement basically as formed in pellets in advance. The sintered product, in general, is a hard substance and it is especially so when the composite contains diamond particles in the surface to be worked, so it is important to form the pellet as close to the final shape as possible, with a probable shrinkage during the process allowed. In the case of manufacture of wheel forming dresser, the pellet should be formed in a die prepared to the final shape, or alternatively, first a cylindrical or prismatic pellet is formed, machined to the shape, and then subjected to the SHS process. Further, a pellet can be deposited with superabrasive particles in the former case, by spreading or adhering the particles in the die over the corresponding surface, filling the matrix composition, and then compressing the whole.

The formed pellet is placed in a compression vessel which is also equipped with an igniter (typically graphite or metallic heater). Various standard mechanical systems are available for compression, such as die pressing, hot pressing and hot isostatic pressing. Here nitride based matrixes can be prepared by using a system isolated from the air, such as a die arranged in a hermetic vessel, in which a nitrogen atmosphere is provided. Further products of more compact structure can be obtained by carrying out the process in a vacuum and thus securing removal of the gases which evolve during the process. A reductive atmosphere of hydrogen or CO gas effectively prevents the deterioration in matrix properties due to the formation of oxide.

The pellet is placed in the compression system, and ignited by turning on the heater under no or light compression. A ready combustible powder mixture may be provided as an igniting material between the pellet and heater.

In the case the matrix composition itself is used as the principal heat source, compression is started for squeezing the composition immediately after the combustion has just completed when the wave has essentially reached the opposite end of the starting point and the whole material is sufficiently heated, and it is held until the material is cooled down to less than 800° C. The time delay between the heating and compression is given in order to secure combustion wave which is significantly slow or even difficult to propagate in the dense mass of a pellet. In this context it is preferable that pellets as formed of starting composition to be subjected to the SHS process has a density 75% or less the theoretical value of the end product. When the heat volume is supplied by the combustion process of a substance provided in adjacency with the matrix composition, the latter should be compressed to a density as high as possible for achieving the maximum heat conductivity for the substance, regardless those data.

Piston/cylinder type compressing systems can be employed which comprise a compression die made of common or refractory metal or ceramic material, for example, in which a pellet of powder composition is accommodated and an SHS process is set off. These simple techniques are available for commercial applications: a pellet is placed in a piston/cylinder type compression system. Immediately upon the completion of the combustion process, pressure is exerted to the pellet with the piston uniaxially through no pressure medium in a refractory or ceramic die, or alternatively, through a solid state pressure medium of molding sand or the like, which is filled around the pellet.

Although pellets may be compressed directly in a metallic die, the use of mold sand as pressure medium around a pellet gives the pseudo-HIP system which permits an approximate isostatic compression, and thus is suitable for the production of solid shapes.

Hot pressing systems are favorable for the provided heater can be used as a supplementary heat source and thus allows to use matrix compositions of low heat production. The heating equipment can be also used for turning on the combustion.

HIP may be used as an alternative compression technique. A pellet is wrapped in a foil of high melting metal, which is indirectly heated by the heat supplied by an SHS process which is allowed to take place; upon the completion of the combustion compressed gas is introduced to squeeze the pellet uniformly from around, at a pressure around 10 to 100 MPa, which is sufficient as no loss occurs in pressure transmission. Thus in general terms, a formed body of pellet is placed in a hermetic wrap which is degassed and sealed.

It is then subjected to an SHS in an arrangement with a heat producing composition (or chemical oven). The proper heater of the system can be used supplementarily or as a combustion igniter.

In the composite of the invention, superabrasive particles of diamond or cubic boron nitride can be comprised in the ceramic and/or metallic matrix and, in particular, in the phase to be melted or softened during the process. They may be comprised either just on or in the surface over an area corresponding to the working surface, or uniformly in the whole phase. This can be realized by adding superabrasive particles when the powders of starting materials are composed, or by spreading particles in advance over a die area which corresponds to the working surface, in the step of forming the pellet into the final shape, for example. Such technique can be used for the production of abrasives or other wear-resistant materials.

In the manufacture of superabrasive deposited pellets, either a foil or sheet of high melting metal or graphite sheet is inserted between the latter and molding sand, so as to prevent contamination of the diamond by possible impurities deriving from the sand. It is also preferable that a metallic or ceramic substance of good heat conductivity and large heat capacity is arranged in contact with or in indirect but close adjacency with the superabrasive so that part of the heat producing during the process be deflected and the superabrasive may be well protected from heat buildup and resulting transition of the diamond or cubic boron nitride to the low pressure phases.

In the composite of the invention, the matrix to hold the superabrasive as well as the support body may consist of carbide, nitride, boride, and/or alloy or intermetallic compound of certain variety of metals selected as necessary, which include titanium and nickel.

The inventors have found that the performance of wear resistant material or grinding and, in particular, cutting tool can be better secured by improving the retention of the particles to the matrix, by coating in advance the former with a material which is capable of forming a chemical bond with both the matrix and superabrasive.

For a superabrasive containing composite manufactured by SHS as by the invention, some matrix composition may not allow the product to perform so well as expected, due to an insufficient retention, even if the superabrasive is essentially free of heat damaged particles. It is likely that such retention shortness is caused principally by insufficiency in the number of sites of chemical bonding between the matrix and superabrasive. In the case when powder of a transition metal is mixed in the matrix, for example, each particle is not always covered entirely with the metal. Further it is not possible that the time of heating, which is on the order of several seconds, as described above, is too short for the metal to diffuse among and cover the particles.

Coating materials available for improving the retention of the super-abrasive include Si, Ti, Cr, Mo, W and other metals of the fourth, fifth and sixth groups of the periodic table, as well as carbide, nitride and boride of the transition metals. The latter can be coated by vapor deposition, CVD and other standard techniques.

While the metal as deposited on the superabrasive can be converted at least partly to a compound and thus a firm adhesion results between the metal and carbon under the high temperature condition provided by the SHS process, it is preferable that the compound should be preformed in advance to the SHS process. For example, diamond particles can be first coated with Ti film by vapor deposition in a vacuum, and then heating to 800° C. in argon or in a high vacuum to create a TiC layer. Total conversion of the film is not necessary, but it is sufficient that TiC be formed only over the area to come in contact with the superabrasive. The particles should not be heated to the high temperature for the carbide formation for an excessively long time, since they become corroded to form vacancies or gaps in the particles and, thus, decrease in adhesion between the coat and substrate, as a result of the diffusion of carbon atoms into the metal in adjacency with the borders. The heat treatment, as conducted in a nitrogen atmosphere, can produce a TiN film on the diamond substrate.

On the other hand, a substrate of boron nitride, in high pressure polymorphism, may be coated with nitride or boride, by depositing with transition metal which is then heated.

Mo or W based metallic coat on the substrate of diamond is effective for improving the adhesion of the superabrasive to the matrix. While the coating and substrate are joined firmly through the intermediate layer of carbide, the metallic coating exhibits on the surface a better wettability to the matrix than the substrate of diamond, so agglomeration of particles is effectively prevented in the stage when a molten phase occurs in the matrix and, as a result, a structure of uniform superabrasive distribution is achieved through particle rearrangement. This effect is more remarkable with smaller abrasive particles. Mo and W may be used as their mutual alloy.

The superabrasive may be coated with an alloy of transition metal. When diamond particles are coated with Ni or Co based alloy containing Ti, Cu or Al, there will be a firm adhesion through TiC between the diamond and coating, and through the metallic component in the coating between the particles and matrix.

A second coating of Cu containing metallic material, deposited atop the above described first metallic coating, achieves an improvement in adhesion to the matrix which is effected by the Cu metal or alloy. It also suppresses the transition of substrate superabrasive to the lower pressure polymorphism, with possible local heat buildup effectively eliminated during the SHS process.

Such second metallic coating is provided by various standard techniques: depositing the metal by electroplating, chemical plating, vapor deposition, or by first depositing a compound of corresponding metal, followed by reduction to the metal. Those techniques are described in the publication "Adhesion of diamond and glass, and brazing of diamond", by Naidich, Yu. B., et al, 1988, Naukova Dumka.

The adhesion between the first and second metallic coatings may not necessarily be complete, since a firm adhesion is secured by fused metal which forms in the second coating under the heat condition of the SHS process and which penetrates between the gaps.

However, it is logical to heat treat the coated abrasive particles to be added to a matrix composition and thus form in advance a layer of alloy of the first and second coated metals at the interface for the purpose of increasing their adhesion. Such treatment can also yield is a compound between the abrasive substrate and first coated metal, so firm adhesion can be achieved based on the chemical bond at the interfaces between the abrasive substrate, first and second coated metals by the single cycle of heat treatment.

It is known that the graphitization of diamond is promoted by coexistence of oxygen, which is more remarkable with smaller particle sizes. In this context, the metal coatings secure the superabrasive properties by effectively blocking the graphitization promotion and decreasing possible local damage to the particles due to heat buildup at high temperatures. In the invention, thus, very small diamond sizes of or less than 5 $\mu$m are now available for the manufacture of sintered compacts by SHS, eventually for the substitution for some of the conventional products by ultrahigh pressure process. Thus the superabrasive particles to be used in the invention should have a nominal, or average, size of or greater than 1 $\mu$m and, preferably, five micrometers or more. Particle sizes less than 1 $\mu$m may yield products of insufficient wear resistance, as they are too active and too sensitive to the environmental temperature, so are ready to transform to the more stable phase when heated during the SHS process.

Addition to the matrix of hydrogen forming compound, such as TiH2 is found effective for preventing possible deterioration in particle properties and adhesion to the matrix due to oxidation of the coating metal by coexisting oxygen. There is a limit, however, to such addition, since the compounds are neutral to the SHS process. The adequate proportion is something between 0.2 and 15 weight %, and preferably 1 and 5% the matrix composition.

Wear-resistant materials may sometimes meet the performance requirement with a single layer arrangement of superabrasive particles over the working surface, since they usually are demanded the performance only on the surface, while in contrast the whole body are demanded to be ready for machining with given tolerance. However such abrasive arrangement on the surface alone only gives an unfavorably insufficient service life for grinding applications. Thus for a design which has a moderate thickness under the working surface, a good working abrasive material can be obtained by making the body at this portion of two structures, with the first, which is in contact with the working surface, wear-resistant by comprising either uncoated or metal coated superabrasive particles, and the second, which is farther from the working surface, consisting of a same composition as the matrix but free of the superabrasive, for the purpose of reinforcing the first structure.

In the invention excessive temperature rise during the SHS process and resulting deterioration in particle properties are effectively suppressed or blocked by admixing a certain stable component to the starting material and diluting combustible components. For the same purpose superabrasive particles, which are neutral to he SHS process, serve as an effective thinner, as well as such stable reaction products of carbides, nitrides, borides, and oxides. Here both good matrix retention for superabrasive and its properties can be secured with possible overheating in the working surface effectively eliminated, by distributing the particles in such a way that the superabrasive is comprised most in the surface, and is decreased stepwise towards the substrate, for example.

Titanium carbide ceramic and TiAl alloy are suitable as a material for the skeletal structure and filling the gaps, respectively, for applying the composite of the invention to a diamond containing composite. The diamond particles are firmly joined with the matrix chemically by means of the TiC which forms on the particle surfaces. This increases not only the service life, which is terminated by the popping out of the particle, but also the particles can achieve a solid adhesion with a shallow embedding in the matrix, even with a flat joint of little penetration, to a degree that the working surface can be almost totally covered with diamond particles alone, or a sufficient clearance may be provided among adjacent particles for the removal of grinding or passage of cooling fluid, in order to secure a good performance.

For the application of the invention to the manufacture of cutting or grinding tool parts, such as blades and honing sticks, a material more brittle than the principal components is added to the matrix composition. Such components suitably include alumina, magnesia, and other high melting compounds. They become crashed and pulled out, when used under load, to form chip pockets and thus contribute for blocking the loading related decrease in grinding performance.

Boron powder is used in the place of the carbon described above, in the case when a Ti—B compound is employed as a principal component for the matrix. Here again TiC forms at the interfaces of the matrix and diamond, simultaneously, which is effective for increasing the adhesion of the abrasive particles and matrix, as well as the $TiB_2$.

The metallic coatings described above show an adequate thickness which ranges from 1 to 20%, inclusive, the average particle size of superabrasive to be coated. Too thin a coating less than 1% gives an insignificant effect, while a relative thickness over 20% the average particle size remarkably shows the properties of the coated metal itself, resulting in a decreased in matrix retention, or mechanical strength of the particle as a whole.

The content of coated superabrasive particles in the matrix essentially depends on the both application they are used and the temperature conditions the matrix is formed under. For the manufacture of grinding tools, for example, a coated abrasive content of 5 to 20 vol % is adequate, so temperature conditions necessary for sintering the compact can be achieved by normal SHS with a properly selected matrix composition. On the other hand a content over 40% is needed for producing cutting tools. The heat requirement can be secured by depositing superabrasive particles at such contents just on a surface which corresponds to the working surface, while composing the rest of SHS matrix. Or the compact is made of two distinct pellets, one of which comprises a portion to correspond to the working surface and comprises more than 40 volume % of superabrasive particles added to the matrix materials, while the second, comprising such matrix materials alone. Further possible cracking, which is caused by difference in thermal expansion at the interfaces between superabrasive containing and non-containing matrix, can be eliminated by provision between them of a buffer of intermediate pellet composition, to take a form of an inclined functional material. It may be multilayered, as desired, with several stacked pellets of gradually varying compositions between the working and support body.

In the case of a matrix composition which contains rather a high concentration of superabrasive and thus produces less heat than required for accomplishing the sintering process, the heat requirement can be met by providing in adjacency with the matrix a chemical oven, or a composition which is so formulated as to work as a supplementary heat source and be capable of filling up the shortage with the SHS reaction heat. The chemical oven, when arranged not immediately in touch with the principle pellet material, may be composed of aluminum and iron oxide, as conventionally employed. As such combination, however, yields molten iron, the system Ti—C is appropriate instead for a product to which its fusion is unacceptable. There is no melt related troubles with this system since solid TiC particles form quickly, and further the reaction products serve as a solid state pressure transmitting medium to provide favorably a pseudo-isotropic pressure condition at high temperatures. Thus the SHS based method of the invention, as using the chemical oven technique, allows to effectively produce hard materials which contain up to 85 vol. % of superabrasive particles. Such chemical oven also can be used as a cooling retarder to prevent possible cracking to occur in the sintered product due to thermal stresses.

The chemical oven technique is employed not only for filling up a thermal shortage, as described above, but also the whole heat requirement for the forming and sintering process of a product. Matrix compositions, based on WC, SiC, or $B_4C$, for example, may yield a temperature insufficient for the sintering, due to too small a heat production in the SHS with corresponding materials, while matrixes of carbide, nitride, boride, silicide or other compounds which are stable and another substance which yields melt under the conditions used for the process, do not produce such an intense heat as observed in the other SHS processes. For such matrixes, a pellet is formed and placed in a sintering die, while an SHS capable composition is arranged in adjacency around it as a mixed powder or as an addition to molding sand, which then is ignited essentially at the same time with the pellet, in order to fill up the shortage in heat supply for the on-going process. The chemical oven can be used as a secondary heat source during the pellet cooling stage in order to prevent the just sintered pellet from undergoing an acute cooling and eventual cracking of the product.

For the preparation of the first composite product of the invention, a powder mixture is first provided which comprises ceramic-forming materials, such as titanium metal and carbon, as well as aluminum or another ingredient to form rather a low melting alloy, titanium and carbon, or titanium and aluminum. It may further contain powder of superabrasive, as desired, such as diamond or cubic boron nitride.

The powder mixture is formed in a die into a pellet of given geometry, then placed in another die of some tolerance around it, which is filled with molding sand; an igniter is provided in contact with the pellet at an end.

The sintering die, loaded as described above, is mounted on a compressing system. The igniter is turned on to initiate the combustion of the pellet with no or slight pressure exerted. With a little lag of time (a few seconds) from the beginning of the process, the die is operated to compress and form the pellet in molten or semi-molten state.

In the invention densification proceeds as the skeletal structure gaps are filled with metallic phase. The compression can be thus saved by using a material composition which is so formulated as to yield a sufficient volume of molten phase. As for the preparation of a Ti—Al—C system composite, for example, the system usually yields an SHS heat volume sufficient for forming TiAl alloy, which shows a melting point of 1460° C. Thus the densification takes place by means of molten phase which is present to infiltrate the product.

The level of densification of a composite product depends on the proportion of metallic phase comprised in the starting materials. Thus FIG. 1 shows the variation in product bulk density, theoretical and observed, of a TiC/TiAl composite with TiAl content. The compression load to the pellet was 100 MPa. The figure indicates that a product bulk density close to the theoretical value is achieved over a TiAl concentration range of about 30 to 80 mol. %.

Various conventional techniques are available for starting up the SHS process. For example, an electroresistive heater or another heat source is arranged in contact in part with a pellet of formed powder mixture at a central top, in particular; providing in contact with the pellet over the central top a powder mixture, which is then ignited to produce an intense heat and, with that, ignite the compact; or providing such heat source in adjacency around and turning on the synthesis process by means of an intense heat from around. For a system which is to produce an insufficient volume of heat, the mixed powder is used as a secondary heat source, as described above, along with a separate main igniter and facilitate to turn on the combustion.

In the invention a structure is provided which consists of hard particles formed by SHS and joined with each other. A technique is also provided for readily producing sintered composite products of high melting carbides, nitrides or borides, which have been heretofore difficult to obtain in dense structure, by filling the internal pores and gaps with metallic material. Here in the production of a composite with TiC based matrix, for example, the only starting materials of titanium and carbon may be mixed with a filling material which is selected among metals: Al, Si, Ti, V, Cr, Mn, Fe, Co, Ni, Cu, and Zr, their alloys, and intermetallic compounds such as Ti—Al, Ni—Al, and Ti—Ni.

In the invention, as applied to the production of a TiC matrix superabrasive composite, for example, aluminum or nickel is added as the third ingredient to the titanium and carbon, and is molten to infiltrate among the skeletal structure, which essentially consists of titanium carbide, formed as a result of the reaction between titanium and carbon. The molten alloy of Ti—Al or Ti—Ni (each in intermetallic compound) infiltrates and fills internal gaps to leave a densified structure.

In the above description, Ti—Al and Ti—Ni alloys exhibit melting points of approximately 1460° C. and 1330° C., respectively, in comparison with TiC which melts at 3070° C. Thus melt of such alloy may form as the temperature attained during the process is sufficient for Ti—Al and Ti— Ni, if not TiC, and densify the structure by accumulation or infiltration. Here aluminum and nickel powder, if mixed in the materials, may be effective for the densification with NiAl alloy which forms in situ.

Such materials to fill up (for densification) is comprised to a content of 5 or more volume % relative to the basic materials as a whole. Favored fillers for TiC based matrixes include, among others: Ti, Co, Ni and Cu metals, Ti—Al, Ni—Al, and Ti—Ni systems. Ti, in particular, is used in powder in excess of the stoichiometry for the carbon used in the material system.

Compression is started on the die and the pellet inside in molten or semi-molten state, at a time a whole-pellet temperature is reached over the melting point for the metal charged or the intermetallic compound formed in the SHS process (usually several seconds or several tens of seconds after the beginning of the combustion and after 0.1 to 10 seconds from the termination). The maximum pressure is held for 2 to 150 seconds, and preferably 2 to 60 seconds, and 2 to 30, in particular.

In the invention, the chemical oven technique, as described above, is employed for a pellet construction which is too small or a composition which will not cause a temperature increase sufficient for melting or softening the corresponding ingredients in the matrix composition. That is, an SHS capable composition is arranged in the die in adjacency, or in mix with molding sand, around the formed pellet. It is used as a secondary heat source to ignite substantially at the same time with the pellet; it may be also used for slowing down the cooling of the densified pellet. The combustion product serves as a pressure medium when compressed with the molding sand.

By the invention the use of an SHS process as an outside heat source, or chemical oven, facilitates the manufacture of various composite products, by eliminating inconveniences inherent to conventional techniques, such that: diamond dispersed wear-resistant composites with a WC—Co matrix, cutting blades with diamond particles in a cobalt matrix, or turning tool elements with cubic boron nitride particles in a Ti—Ni matrix are heretofore prepared commonly under ultrahigh pressure condition using an expensive equipment or, alternatively, at the cost of some deterioration in particle properties under thermodynamically metastable condition for the high pressure stable superabrasive particles.

As described above, an aspect of the present invention is based on the use of an SHS process or a chemical oven, which essentially shows the maximum attainable temperature sufficiently high and which provides high temperatures over a very short period. With this, powder metallurgy is available for the preparation of diamond containing sintered composites with less deteriorated superabrasive particles, relative to the conventional technique based on the electric heating. Also it is available for the manufacture of metal bond tool materials with smaller diamond particles than heretofore, or tool elements with diamond particles secured in the bond and simultaneously joined to a metal backing.

The maximum temperature attainable in the SHS materials during the process can be estimated from the adiabatic combustion temperature in the formation of corresponding product. Thus in case the estimated temperature may exceed by far 2000° C., measures should be taken for controlling the temperature which would enable to decrease the duration and thus prevent possible transition of the superabrasive to the lower pressure polymorphism, by diluting the starting materials with substance neutral to the process including superabrasive particles or, preferably a compound of product system.

The matrix components of the invention are selected widely, singly or in combination, among systems based on the carbides, nitrides, borides of the fourth to sixth group metals of the periodic table, as well as Sic, $Si_3N_4$, $B_4C$, intermetallic compounds of Ni—Al, Ti—Al, Ni—Al—Ti and Ni—Al—Ti—Cu, and their mixture, in accordance with the particular uses or purposes. In those materials, the carbide, nitride and boride of titanium are in particular favorable in manufacture cost, as well as the intermetallic compounds in the Ni—Al, and Ti—Al, and their combinations.

For obtaining a hard and compact construction of composite a combination should be employed which comprises two material systems: one forming a hard substance by SHS process, while the other forming molten phase during the process. A compact matrix may be provided of TiC which consists the skeletal structure, mixed with Ti—Al, for example, which fill the internal gaps. Addition to the above system of a proportion of copper can improve the thermal conductivity and thus suppress the unfavorable transition of the superabrasive substance to the more stable polymorphism.

To take some examples, these formulations in weight percentage are available for producing rather high hardness composite products: 60 to 90% Ti or Zr, 3 to 12% C or B, 2 to 18% Al, 1 to 5% $TiH_2$, 1 to 7% Cu, 3 to 20% Ni or Co, while these are suitable for wear-resistant matrix requirement: 60 to 70% Ti or Zr, 3 to 12% C or B, 2 to 18% Al, 1 to 15% TiH2, 5 to 25% Mo or W, 1 to 7% Cu, 3 to 20% Ni or Co.

Further support body materials may be placed, as necessary, in the compression area along with the pellet. For example, the end tip alone of a round steel rod, which is to serve as a drill shaft, may be put in the die, which is ready being charged with the formed pellet and a chemical oven composition arranged in adjacency around the former, and the formation of a composite and its joining to the support can be achieved in a single operation. Here the physical properties of the support of steel may not be essentially adversely affected by the SHS process, since the heat evolving in the process, if intense, is limited in a quite limited area which proceeds. A cutting blade can be manufactured based on a similar concept: arc-shaped pellets are placed intermittently on and around a circular blade base, enveloped with a chemical oven composition of high combustion speed and, with the SHS process turned on, compressing the pellet.

The method of the invention, as based on the SHS process which accomplishes the high temperature cycle within just a few seconds, (1) causes little deterioration in physical properties of the superabrasive particles;

(2) affects little the surface nature of. superabrasive, so decease in adhesion to the matrix remains insignificant, or (3) causes little deterioration in physical properties of support material in the operation of combined sintering and joining of the particles to the support body; and (4) allows to prepare matrixes of various compositions as desired;and further, the metal coating on superabrasive particles (5) increases the retention of abrasive particles by the matrix due to a chemical bond which is provided between the both materials as intermediated by the coated metal, and (6) due to an enhanced mechanical joint based on the increased sizes of superabrasive particles by metal coating;

(7) buffers thermal shock on the superabrasive particles; and (8) blocks oxygen which would come in contact and deteriorate the superabrasive particles.

With those effects the method of the invention allows to sinter by SHS fine superabrasive particles of sizes down to 1 $\mu$m, so it not only achieves mechanical properties comparable to those heretofore obtainable only by the ultrahigh pressure technique, but also the method can produces objects of significantly increased size or solid construction. Furthermore a wider range of materials are available for the matrix composition, since the coated metal buffers both the thermal shock and effect on the superabrasive particles, and since high temperature conditions in excess of 2000° C. are now available if limited in duration.

EXAMPLE 1

Powders of 22 $\mu$m titanium, 7 $\mu$m graphite, and under 300 mesh aluminum were dosed and mixed well to prepare a starting material composition, with the Ti:C:Al proportion being 73:11:16, by weight, which corresponds to a TiC/TiAl ratio of 50/50 by volume. The mixed powder is then press-formed, in a die, to a circular pellet 16 mm across and 4 mm thick, and sintered in an arrangement sectionally illustrated in FIG. 3. The equipment, generally designated at 1, basically comprises a die 2, with a recess of 30 mm I.D. and 60 mm depth, and a punch 3. The cavity around the pellet 4 was filled with 80Ti—20 C., by weight, mixed powder 5 to a thickness of 1 mm and molding sand 6 for the rest. A graphite ribbon 7 was placed as an igniter to be in contact with the powder 5 over the pellet 4.

The sintering arrangement, as assembled, was mounted on a standard uniaxial hydraulic press (not shown), and the pellet was ignited by passing electric current through the ribbon while keeping off the punch from the assembly. Pressure was applied with the press quickly after five seconds from the ignition and when the whole pellet was heated sufficiently; then a pressure of about 100 MPa was maintained for 30 seconds. The thermocouple momentarily indicated a maximum pellet temperature of 1700° C. The product exhibited a metallic luster as well as a Vickers hardness of 8 to 12 GPa on a polished surface. The surface was also examined under optical microscopy, to show no pores.

Figure 4:
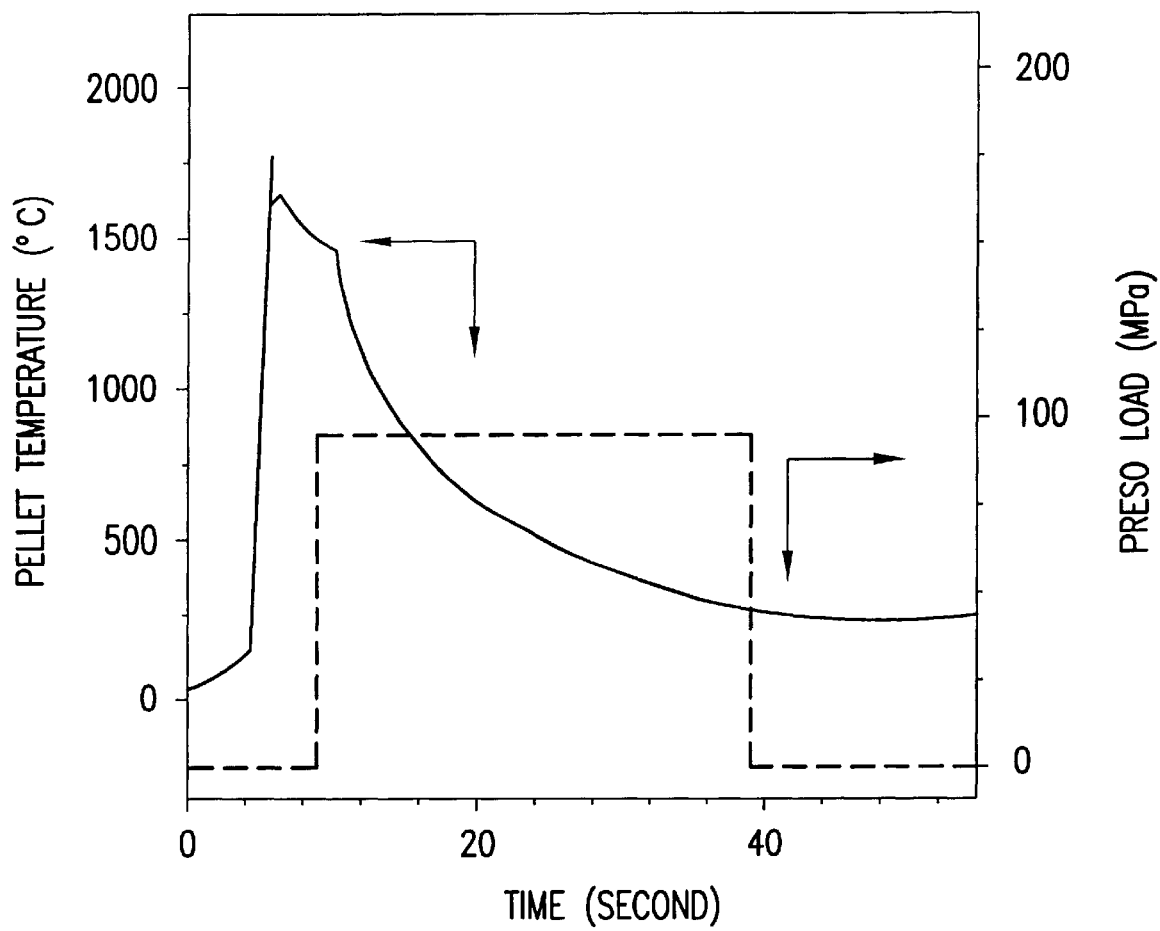
FIG. 4 shows the variation of observed pellet temperature and load applied in Example 1, as plotted against the time lapse from the ignition.

The temperature and press load observed in this example are represented in FIG. 4 against lapse of time from the ignition.

EXAMPLE 2

A pellet was prepared using the same starting material composition as in the Example 1, except that 15 volume % of nominal (average) 100 $\mu$m synthetic diamond powder was added to the composition. The whole powder was filled sufficiently and placed in a die to form a pellet. For sintering, the equipment and method were used as in the example 1. The pellet as prepared was examined on a polished surface by optical microscopy and showed, in general, a regular distribution of diamond particles over the whole matrix, but no trace of graphitization on the particles. Bond tails were noticed for the particles, instead, which evidence that the matrix material composition used could hold diamond particles adequately. The pellet product was fixed to a support and used for the grinding of end surface of a ceramic material.

EXAMPLE 3

Pellets were prepared using the same starting material as in Example 1, except that 300 mg of nominal 100 $\mu$m synthetic diamond powder was placed in advance in each forming die on the bottom. For sintering the arrangement and operation were essentially the same as in the antecedent example, but that a cup of tantalum metal, of 16 mm I.D. and 2 mm depth (wall thickness 50 $\mu$m), was put over the pellet lower portion (that is on the diamond end) for the protection of the diamond. An alumina disk, 16 mm across and 10 mm thick, was placed in contact and in alignment under the cup for the purpose of cooling. The pellet product comprised 1 mm thick diamond containing layer in one end. The optical microscopy revealed no graphitization on the diamond particles, and evidenced that they would be held adequately by the matrix. One of the sintered pellets was further machined to the given dimensions and used as a cutting tool element, while the others, as a detector end and specimen holder for a thickness measurement system.

EXAMPLE 4

Tables 1 to 3 summarize the compositions of SHS products for some starting matrix materials. Of them Table 1 relies, for the production of a composite, on the heat supply from within by the SHS of matrix materials either in the open air, in a vacuum, or in a reductive atmosphere, and Table 2, in a nitrogen atmosphere; while Table 3 employs an SHS process as a chemical oven. The powder particle size used was nominally 22 $\mu$m for the titanium, 7 $\mu$m for the carbon, finer than 20 $\mu$m for the amorphous boron, 0.3 $\mu$m for the alumina, and under 325 mesh for all the rest, mixed at proportions which varied over a wide range. Since the SHS products varied widely in nature, the tables only can list the starting materials and reaction products in arrangement of kinds of elements and compounds, with the coefficients saved. As the tables mainly are related to the systems comprising titanium, similar results can be obtained with other metals such as Zr, Hf, V, Nb, Ta, Mo and W.

TABLE 1

| Starting Materials | Products |
| --- | --- |
| Ti + C | TiC—Ti—Al |
| Ti + C + Al | TiC—TiAl |
| Ti + C + Fe | TiC—TiFe—Fe |
| Ti + C + Ni | TiC—TiNi—Ni |
| Ti + C + Co | TiC—TiCo—Co |
| Ti + C + Si | TiC—SiC—TiSi—Si |
| Ti + C + Cu | TiC—TiCu—Cu |
| Ti + C + Al + Co | TiC—TiAl—TiCo—AlCo |
| Ti + C + Fe + Co | TiC—TiFe—TiCo—FeCo |
| Ti + C + Ni + Al | TiC—TiAl—TiNi—NiAl |
| Ti + C + Fe + Al | TiC—TiAl—TiFe—FeAl |
| Si + C | SiC—Si |
| Si + C + Ti | SiC—Ti |
| Si + C + Ni | SiC—NiSi—Ni |
| Si + C + Co | SiC—CoSi—Co |
| Si + C + Fe | SiC—FeSi—Fe |
| Si + C + Cu | SiC—CuSi—Cu |
| Si + C + Al | SiC—AlSi—Al |
| Ti + B | TiB—Ti |
| Ti + B + Fe | TiB—TiFe—Fe |
| Ti + B + Ni | TiB—TiNi—Ni |
| Ti + B + Co | TiB—TiCo—Co |
| Ti + B + Si | TiB—TiSi—Si |
| Ti + B + Cu | TiB—TiCu—Cu |
| Ti + B + Al | TiB—TiAl—Al |
| Ti + Si | TiSi—Si |
| Ti + Si + Cu | TiSi—TiCu—SiCu |
| Ti + Si + Ni | TiSi—TiNi—NiSi |
| Al + NiO + $Al_2O_3$ | $Al_2O_3$—NiAl |
| Al + CoO + $Al_2O_3$ | $Al_2O_3$—CoAl |

TABLE 2

| Starting Materials | Products |
| --- | --- |
| Ti | TiN—Ti |
| Ti + Al | TiN—AlN—TiAl—Al |
| Ti + Ni | TiN—TiNi—Ni |
| Ti + Co | TiN—TiCo—Co |
| Ti + Al + Ni | TiN—AlN—TiAl—TiNi—NiAl |
| Ti + Si | TiN—$Si_3C_4$—TiSi—Si |
| Ti + Al + C | TiC—TiN—AlN—TiAl—Al |
| Ti + Ni + C | TiC—TiN—TiNi—Ni |
| Ti + Al + Ni + C | TiC—TiN—AlN—TiAl—TiNi—NiAl |
| Al + Ni | AlN—NiAl |

TABLE 3

| Starting Materials | Products |
| --- | --- |
| TiC + Ni | TiC—Ni |
| TiC + Ni - Mo | TiC—Ni—Mo |
| Various metals, alloys and intemetallic compounds, other than the above, are available. | |
| TiN + Ni | TiN—Ni |
| TiB + Cu + Ni | TiB—Cu—Ni |
| WC + Co | WC—Co |
| SiC + MnSi | SiC—MnSi |
| $MoSi_2$ + NiSi | $MoSi_2$—NiSi |
| Co | Co |
| NiAl | NiAl |
| B + C + Ni | $B_4C$—Ni |

EXAMPLE 5

Ti/Ni/C mixed powder was used as a matrix material in a proportion of 65:24:11 by weight; a first pellet was prepared from the above composition to measure 98 mm across and 10 mm thick, while a second pellet was prepared by adding 50 weight % (of 30/40 μm) diamond powder to the above, to measure 98 mm across, and 2 mm thick.

For the SHS process, a sintering system was used which comprised a die lined with a mullite sleeve of 100 mm I.D. and 125 mm O.D., and a punch shielded with a 99 mm across, 10 mm thick mullite disk, which as a whole mounted on double-acting press. The both pellets were loaded in a stack in the die, and an igniting heater was put in contact with an end of the pellet of matrix without superabrasive particles. A pressure of 80 MPa was applied to the combustion product after 12 seconds from the ignition (and about one second from the completion of combustion), and maintained for 40 seconds. The products were ground on the both sides and cut into given lengths for the use as an edge of wood turning tool.

EXAMPLE 6

An 80 mm across, 10 mm thick pellet was formed, which consisted of mixed powder of an Fe to Cr proportion of 52 to 48 (by weight). A single particle layer of 200/230 mesh diamond particles was spread in the die over the recess bottom essentially regularly in advance to the pellet material loading, in order to provide a diamond deposit on one side of the pellet. It is then loaded on the sintering arrangement of Example 5, which comprised a mullite lined die and mounted on a double-acting press. An equimolar mixed powder of titanium and carbon was charged in adjacency around, over and under the pellet to a thickness of 10 mm, for the purpose of heat supply. A pressure of 150 MPa was exerted on the product after 10 seconds from the ignition, and about 2 seconds from the completion of the combustion, and maintained for 30 seconds. The product was used as a lapping board for ceramic materials.

EXAMPLE 7

A sintering system was used which was similar to the one used in Example 5 but comprised a die with a 100 mm across recess, instead. A 75 mm across, 1 mm thick blade base of SUS grade stainless steel was put between circular steel blocks 65 mm across, and as a whole placed in the die recess at the center. Pellets, made of 9 to 1, by weight, WC:Co pre-mixed powder, added with 15% of 60/80 mesh diamond particles, was arranged around the pellet, which each were 5 mm wide and 1 mm thick. An equimolar mixed powder of titanium and carbon was placed to a thickness of 10 mm around, over and under the pellets. A heater was arranged to be in contact with the Ti/carbon mixed powder at one end; the rest of the recess was filled with molding sand. The heater was turned on to ignite the powder; compression was started after less than 0.5 second from the completion of the combustion, and a pressure of 100 MPa was exerted to the powder and held for 20 seconds. The product comprised segments of carbide alloy plus diamond, which were brazed to the circular base around the periphery, and used effectively as a blade for cutting ceramics.

EXAMPLE 8

A magnesia cone was used as a core, around which a composition of 10 to 1, by weight, mixed powder of $Si_3N_4$/Cr and 35% 20/30 mesh diamond was filled. The whole was formed by CIP and machined into a cylindrical specimen. It was placed in a thin walled container of tantalum, degassed and sealed. An equimolar mixed powder of aluminum and iron was filled as an SHS medium, with which a heater was put in contact. The assembly was mounted on a HIP equipment, which was degassed, then filled with argon gas to a pressure of 1 atm., and the heater was turned on. Upon the combustion, compressed gas was introduced, and a pressure of 30 MPa was maintained for 30 seconds. The product was removed of the magnesia cone, and ground on the inside surface to make a nozzle for the sand blast machine.

Next, diamond and cubic boron nitride particles were coated as summarized in the table below, where the symbol "D" stands for diamond.

TABLE 4

| Run No. | Kind of abrasive | Size ($\mu$m) | first coating | | second coating | |
|---|---|---|---|---|---|---|
| | | | material | thickness ($\mu$m) | material | thickness ($\mu$m) |
| 1 | D | 30/40 | Ti | 0.5 | — | |
| 2 | D | 30/40 | Ti | 0.5 | Al | 0.5 |
| 3 | D | 120/150 | Mo | 2.0 | — | |
| 4 | D | 120/150 | Mo | 2.0 | Cu | 1.0 |
| 5 | D | 6/8 | W | 0.2 | — | |
| 6 | D | 40/60 | [1] | 1.0 | — | |
| 7 | D | 40/60 | [2] | 5.0 | — | |
| 8 | cBN | 80/100 | Mo | 2.0 | Cu | 0.5 |

Note
[1] 60Mo—40W (wt %)
[2] 3Ti—5Cu—10Al—82Ni (wt %)

EXAMPLE 9

As matrix materials provided were powders of 22 $\mu$m titanium, 7 $\mu$m graphite, under 325 mesh aluminum. They were dosed to a Ti:C:Al proportion of 73:11:13 and mixed properly for the use. The powder composition was mixed with 2 weight % of TiH$_2$ powder, and further with the coated abrasive (diamond, precisely) particles of the kind used in the table above run no. 1, to a volume 10% the matrix, and compressed with a load of 10 MPa to form a cylindrical pellet 40 mm across and 20 mm thick. For sintering the arrangement illustrated in FIG. 3 was used, but with a die recess of 75 mm I.D. and 65 mm depth. Molding sand was first laid in the die over the bottom to a depth of 15 mm, then the pellet; sand was again filled around the pellet. 1 to 1 Ti/C mixed powder was laid over the pellet to a thickness of about 5 mm, with which an igniter 7 of graphite ribbon was put in contact, then covered with an 8 mm thick layer of sand. A punch was pressed against on the sand for compression. A thermocouple (not shown) was provided in contact under the pellet. The arrangement, as assembled, was mounted on a uniaxial hydraulic press; electric current was passed to the graphite ribbon to ignite the pellet without exerting compression. Upon that a temperature of 1900° C. was attained in the pellet on the bottom end, the press was operated to exert an approximate pressure of 100 MPa, which was held for 40 seconds. The process record indicated that the compression started about 0.5 second after the completion of the combustion.

The product exhibited a metallic luster in the matrix, which was analyzed to consist of TiC and TiAl by X-ray diffractometry. The optical microscopy on a polished surface showed a regular distribution of diamond particles in the matrix, with an obvious improvement over the conventional technique of using uncoated superabrasive particles which often caused agglomeration. Further no graphitization was noticeable on the diamond particles.

EXAMPLE 10

The matrix used consisted of mixed powder of 65Ti-10B-9Al-4Cu-10Ni-2TiH2, by weight. A circular pellet, 98 mm across and 2 mm thick, was formed from a mixture of 30%, by volume, of said powder and 70% of the coated superabrasive, described in Table 4 above at run no. 2. The same matrix material of was used to form another pellet 98 mm across and 15 mm thick, this one without any superabrasive particles. The both pellets were stacked, with the one of matrix materials alone over the one containing diamond, and placed in a die lined with a mullite sleeve to provide a 100 mm I.D. A 1:1 Ti/C mixed powder was laid over the pellet to a thickness of 5 mm for leading fire, and a graphite ribbon for ignition. The cycle from ignition to compression was similar to that in Example 1, but that the compression was started after about 2 seconds from the completion of the combustion. The product was cut to the given shape, polished and used as a turning tool element.

EXAMPLE 11

Figure 3:
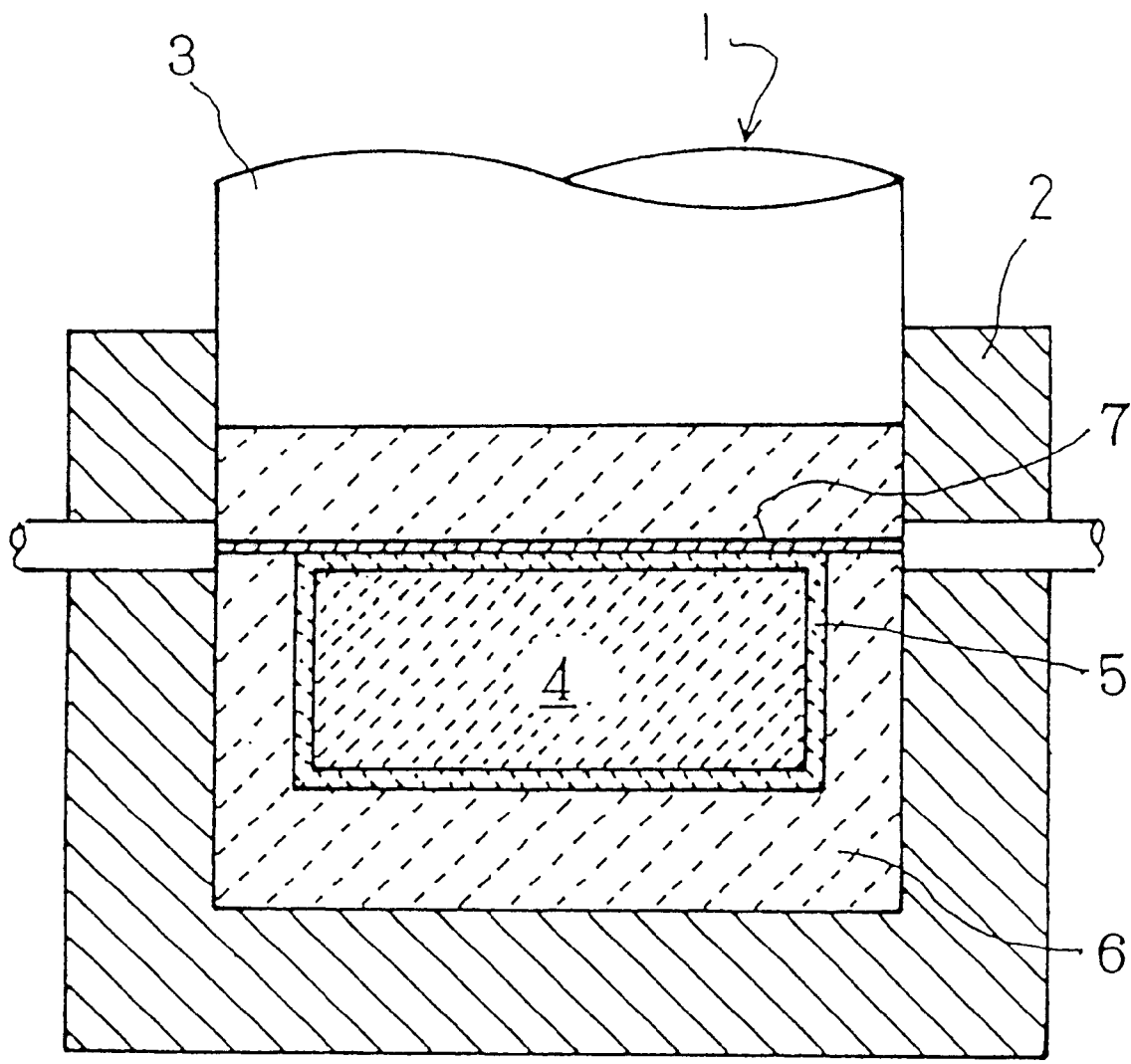
FIG. 3 shows a diagrammatic sectional illustration of the die arrangement used in the examples.

An arrangement shown in FIG. 3 was employed, which comprised a die recess 100 mm across. A 75 mm across, 1 mm thick blade base of SUS stainless steel was provided and circular blocks of steel 65 mm across were arranged on the both sides. 5 mm wide, 3 mm thick pellets were made of powder composition of 60Ti-10C-10Al-3TiH$_2$-5W-5Cu-7Ni (by weight), mixed with 20 volume % of the coated diamond particles described in Table 4, run no. 3, and arranged on the blade base periphery. An equimolar mixed powder of titanium and carbon was filled around the pellets as a chemical oven material. A heater was arranged in contact with the mixed powder, with the rest filled with molding sand. Pressure was exerted after about one second from the completion of the combustion, and a pressure of 100 MPa was maintained for 30 seconds. The product was employed as a blade for cutting ceramics.

EXAMPLE 12

A powder composition of 65Ti-23Co-12Al (by weight) was mixed with 15 volume % of the coated abrasive given in Table 4, run no. 4, and formed into a circular pellet 40 mm across and 12 mm thick, which was placed in the die as used in Example 9. An equimolar Ti:C mixed powder was laid over the pellet to a thickness of about 5 mm for leading fire; a heater was set to ignite said powder, and the rest of the cavity was filled with molding sand. The whole die was loaded in a hermetic container, which was degassed and then filled with nitrogen, and the pellet was ignited. Compression was started immediately after the thermocouple on the pellet bottom indicated 2000° C., and a pressure of 100 MPa was exerted on the pellet for 20 seconds. The product composite showed matrix of TiN, TiAl and TiCo, scattered with firmly held diamond particles. Optical microscopy was conducted on a polished section of the product and showed good adhesion of the abrasive particles to the matrix, with no appreciable gaps between them. The diamond held its initial clarity before the process and showed no graphitization. The product was machined as designed, and used as a dresser tip.

EXAMPLE 13

Under 20 $\mu$m 70Ni-30Al (in weight %) powder composition was used for matrix. It was mixed with 40 volume % of the coated diamond, given in Table 4 run no. 5 and formed into a 50 mm across, 5 mm thick circular pellet. Another pellet, 50 mm across and 25 mm thick, was formed likewise but using the powder composition, without the abrasive particles. The sintering cycle was operated in a vacuum with the die arrangement and procedures, used in Example 12, for loading and sintering. The product composite exhibited a structure of Ni—Al intermetallic compound matrix, deposited with diamond particles in the surface to a depth of about 3 mm; which was used as an element for a turning tool.

EXAMPLE 14

60Ti-20B-20Ni (in weight %) powder composition was used for the matrix. It was mixed with 20 volume % of the coated diamond, in Table 4 run no. 6, and formed into a 50 mm across, 25 mm thick circular pellet. The die arrangement in Example 9 was again used for the sintering cycle; mixed powder of titanium and carbon was laid over the pellet for leading fire, while molding sand was filled around it. The product had a matrix structure comprising TiB, TiB2 and TiNi, with diamond particles scattered and embedded in it; it did not show any gaps between the matrix phase and abrasive particles, or graphitization on the surface of diamond particles.

EXAMPLE 15

The matrix materials used were the same as in Example 9. Coated abrasive particles of the kind given in Table 4, run no. 7 were spread to a regular thickness in the forming die on the bottom, laid over with the powder composition, and as a whole formed into a pellet which measured 50 mm across and 15 mm thick. The sintering die arrangement was the same as used in Example 9, but that 0.1 mm thick tantalum sheet was lined on the die bottom in advance, and the pellet was placed with the diamond end in contact with the sheet. A thermocouple was inserted between the tantalum sheet and the die. The specimen was compressed to a pressure of 80 MPa, when a temperature of 1700° C. was indicated. The product was used as a tool element for wood machining.

EXAMPLE 16

As in Example 9, the matrix materials were powder composition of titanium, graphite, and aluminum mixed at a Ti:C:Al proportion by weight of 73:11:13. Then a 50 to 50 by volume mixture was provided of said powder and the coated cubic boron nitride particles, given in Table 4, run no. 8, and formed into a circular pellet 30 mm across and 15 mm thick. The die arrangement used was the same as in Example 9. The pellet was loaded, with a 10 mm thick 1 to 1 Ti/C mixed powder filled around as a chemical oven. When a temperature of 2000° C. was indicated under the pellet, the specimen was compressed to a pressure of 100 MPa, which was then held for 30 seconds. The product was machined and used as a tool element for steel turning.

APPLICABILITY IN INDUSTRY

The composite of the invention is useful as a wear-resistant material in various applications and an abrasive tool element.

What is claimed is:

1. Method of producing a superabrasive containing composition which comprises two steps, the first comprising:

forming into a pellet a composed matrix material which comprises bonding material for the abrasive, and the second comprising:

depositing said pellet with superabrasive particles on a surface area which comprises a portion corresponding to the end working surface, heating said pellet and causing to flow said matrix material at least partly, and compressing and densifying the whole by filling the gaps and, thus securing a close adhesion of superabrasive particles to the matrix material, while an SHS process is caused between components contained in the bonding material system, and/or a chemical reaction is caused in a chemical system which is arranged in adjacency with the pellet, thus producing and supplying a heat volume sufficient for said heating and, after 0.1 to 10 second from the completion of the process, a pressure is exerted and held for more than 2 seconds, said pressure being such that the superabrasive substance remains metastable.

2. The method as claimed in claim 1, in which said SHS takes places between matrix components.

3. The method as claimed in claim 1, in which said SHS takes places between components contained in the system arranged in adjacency with the pellet.

4. The method as claimed in claim 1, in which said SHS takes places between a substance or substances contained in the pellet and another substance contained in the atmosphere.

5. The method as claimed in claim 1, in which said matrix material comprises a metallic material selected from Al, Si, Fe, Co, Ni, Cu and alloys and intermetallic compounds which comprise a major part of said metal, and said material is molten to be responsible for the flow.

6. The method as claimed in claim 5, in which said metallic material comprises at least an intermetallic compound in the system of Ni—Al, Ti—Al and/or at least an alloy of Ni—Al—Ti or Ni—Al—Ti—Cu.

7. The method as claimed in claim 1, in which said matrix essentially comprises a refractory substance selected from SiC, $Si_3N_4$, $B_4C$, and boride, carbide or nitride of metal in the fourth to sixth groups of the periodic table.

8. The method as claimed in claim 1, in which said matrix material further comprises as a diluent a substance which is essentially neutral to said SHS process and which remains unmolten during the process.

9. The method as claimed in claim 1, in which, in the second step, a pressure medium is used for compression which comprises the products of SHS process and/or molding sand.

10. The method as claimed in claim 1, in which said superabrasive comprises diamond or boron nitride in high-pressure polymorphism.

11. The method as claimed in claim 1, in which, in the first step, said pellet in the whole is deposited regularly with superabrasive particles.

12. The method as claimed in claim 1, in which, in the first step, said pellet is deposited with superabrasive particles just in the portion which corresponds to the end working surface, with its adjacency included.

13. The method as claimed in claim 1, in which said superabrasive particles are deposited with a coating system of metallic and/or ceramic materials.

14. The method as claimed in claim 13, in which said coating system comprises a metal selected from the fourth to sixth groups of the periodic table plus aluminum.

15. The method as claimed in claim 1, in which, in the first step, said superabrasive particles are used in mixture with powder of said matrix material.

16. The method as claimed in claim 1, in which, in the first step, said matrix material is formed into a first pellet essentially free of superabrasive particles, while said particles are comprised and distributed in another, separate pellet of composition identical or similar to that of said first pellet.

17. The method as claimed in claim 13, in which, in the first step, 0.2 to 15% of $TiH_2$ is admixed to the powder mixture of said pellets, relative to the total weight of the pellets with the superabrasive excluded.

* * * * *